Nov. 20, 1962  L. A. ROSENTHAL  3,065,412
METAL DETECTOR

Filed Dec. 23, 1958  3 Sheets-Sheet 1

INVENTOR.
LOUIS A. ROSENTHAL
BY
Walter C. Kehm
ATTORNEY

Nov. 20, 1962 — L. A. ROSENTHAL — 3,065,412
METAL DETECTOR
Filed Dec. 23, 1958 — 3 Sheets-Sheet 2
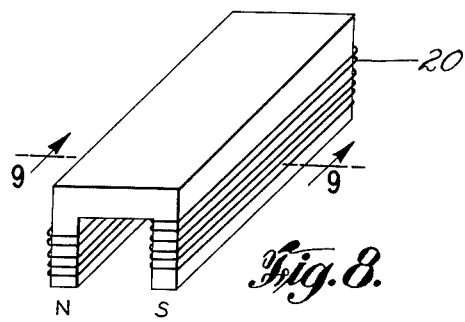
Fig. 8.
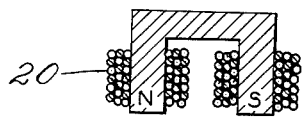
Fig. 9.
Fig. 10.
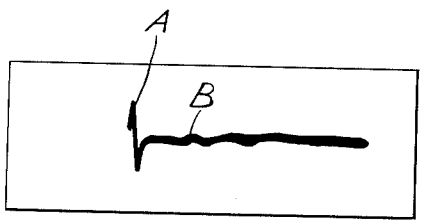
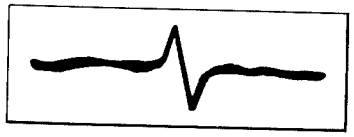
Fig. 10a.
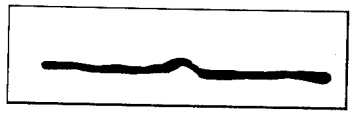
Fig. 10b.
Fig. 10c.
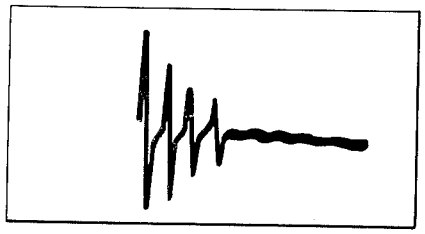
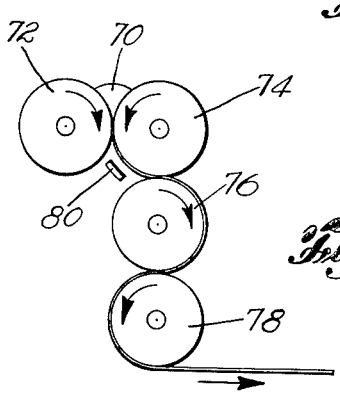
Fig. 11.
INVENTOR.
LOUIS A. ROSENTHAL
BY
Walter C. Kehm
ATTORNEY Nov. 20, 1962        L. A. ROSENTHAL        3,065,412

METAL DETECTOR

Filed Dec. 23, 1958                            3 Sheets-Sheet 3

INVENTOR.
LOUIS A. ROSENTHAL
BY
*Walter C. Kehm*
ATTORNEY

United States Patent Office 3,065,412
Patented Nov. 20, 1962

3,065,412
METAL DETECTOR
Louis A. Rosenthal, Highland Park, N.J., assignor to Union Carbide Corporation, a corporation of New York
Filed Dec. 23, 1958, Ser. No. 782,424
12 Claims. (Cl. 324—41)

This invention relates to a device for detecting pieces of metal. More particularly, this invention relates to a device for detecting pieces of metal in a non-metallic carrier such as plastic.

To convert plastic materials, rubber and the like into usable sheet or film form, to coat these sheets onto a paper, cloth or other suitable backing or to finish them by embossing their surfaces, pairs of rolls are utilized. These are commonly known as calenders or embossing rolls. Sometimes calendering and embossing units are combined.

The plastic material to be formed is passed between two rolls, one or more of which is frequently finished with a polished, sanded or patterned surface which is to be imparted to the plastic material. An embossing roll is often a metal patterned roll backed up by a composition roller. Frequently these rolls are spaced very closely together.

Because of considerable handling prior to the calendering or embossing, contamination by metal particles, such as filings, nuts and bolts and screws is common. Such metal is referred to as "tramp" metal and if it passes between the finishing rolls undetected, it may cause an indentation in the roll surface. This makes the rolls unsatisfactory for further use since the mark will repeat on the material being processed at each revolution. Refinishing of rolls is very costly and time consuming.

The problem of "tramp" metal is also important in the insulated wire field where metal particles in the insulation become points of potential breakdown. The use of a metal detector of the type herein described would make inspection of insulated wire for metallic contamination in the insulating covering very easy.

A metal detector is also useful in the detection of metallic impurities in powders. Magnetic separators are commonly used to remove "tramp" iron and magnetic particles from powders, such as food stuffs, cosmetics and drugs, but they do not remove non-magnetic metals, such as brass, stainless steels and aluminum. The device of this invention detects the presence of even non-magnetic metals in non-metallic materials. This, coupled with suitable controls readily available to those skilled in the art, makes elimination of metallic contaminants possible whether they are magnetic or not. Currently used metal detectors cannot do this because they are based on the change in reactance of a coil through which the material or object must pass.

Metal detectors have been developed which will detect metal particles in plastic compositions or in other non-metallic materials, but such detectors cannot be used for material which is being processed on steel calender rolls. These detectors are used by passing a sheet of the material through a large tuned coil having a high frequency A.C. power. The metal particle detunes the coil, and this detuning is immediately detected by an electronic detection system. A double coil structure can also be used. As the metal particle passes between the coils, an output voltage is induced in the second coil. These high frequency coil systems operate on the bridge principle, whereby an unbalance in two arms of the bridge exists when a piece of metal is in the coil field. The sensitivity of such a system is good; but it goes out of adjustment easily and lacks sufficient stability for continuous operation without attention.

This type of equipment must be used with a non-metallic conveyor carrying the material through the coil or between coils. Since calender and embossing rolls are usually steel, these devices will not work when the films are backed by metal rolls.

It is an object of this invention to provide a method for detecting pieces of metal in non-metallic environments.

It is a further object of this invention to provide a method for detecting "tramp" pieces of metal in non-metallic substances carried on metallic conveyors.

Another object of this invention is to provide an apparatus for detecting magnetic or non-magnetic pieces of metal in non-metallic environments.

A still further object of this invention is to provide an apparatus for detecting all types of "tramp" metal in non-magnetic carriers.

Other objects and advantages of the invention will become apparent in the following description and appended claims.

According to the present invention, metallic particles in non-metallic substances are detected by passing a magnetic flux through a fixed gap of known width, passing the non-metallic substance through the gap while the magnetic flux is being passed through the gap and sensing the change in magnetic flux intensity caused by the presence of the metal particles.

The device of this invention does not depend on maintaining two arms of a bridge in balance. The voltage output from the sensing coil of the device is normally zero and does not change until a metallic particle passes through the magnetic field produced by the device whereby a voltage is generated. Since there is no voltage output when the material being passed is free of metallic particles, there is no difficulty with an unbalance such as occurs with radio frequency tuned coil equipment. This is a great advantage in continuous factory operation where a shutdown of the equipment can be costly if the detecting device goes out of tune and there is a false alarm when no metal is present.

Another advantage of this invention is that it operates with a magnetic metal backing plate or roller, whereas previously known metal detectors will not operate against such metallic belts or rollers.

The terms "magnetic" and "non-magnetic" are used throughout the specification and claims to indicate the characteristics of the metals. "Magnetic" metals include iron, some types of steel, nickel, cobalt and some alloys. Any metal which is attracted to a magnet is "magnetic" for the purpose of this specification. "Non-magnetic" refers to metals which are not normally attracted by a magnet, such as copper, zinc, tin, alloys of these and other metals, and certain stainless steels.

The invention will now be more completely described by reference to the drawings in which, FIG. 1 is a schematic view of the essential features of the device.

FIG. 8 is an isometric view of a U-shaped magnet for use in the invention.

FIG. 9 is an end view of the magnet of FIG. 8.

FIG. 10 is a representation of a voltage output impulse on an oscilloscope screen when metallic particles pass into the magnetic field of the device.

FIG. 10a represents the voltage output impulse when a magnetic particle passes into the magnetic field of the device.

FIG. 10b represents the voltage impulse when a magnetic particle passes into the magnetic field of the device and a simple integrator circuit is used.

FIG. 10c represents the impulse when particles of different sizes pass into the magnetic field of the device.

FIG. 11 is an elevational, schematic view of a typical four-roll calender showing a possible location for the device of the invention.

Figure 1:
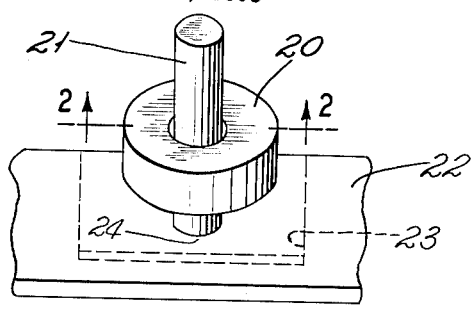
Figure 2:
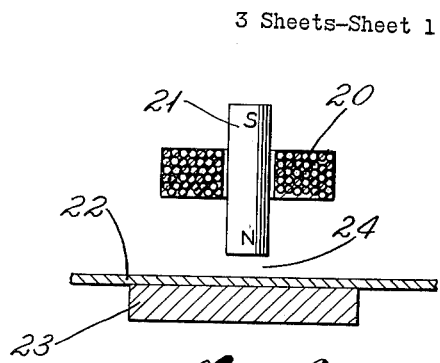
FIG. 2 is an elevational, cross-sectional view of the device.

Referring now to FIGS. 1 and 2, a permanent magnet or pole piece 21 is surrounded by a coil of fine wires 20. The relative positions of the north and south poles of the magnet are unimportant. A sheet of non-magnetic material 22 is shown passing under the permanent magnet pole piece 21. The non-magnetic material 22 is backed up by a material 23, such as iron or steel, which can be in any convenient shape. Flux from the permanent magnet travels through the air gap 24 and plastic sheet 22 into the magnetic material of plate 23 and then returns to the magnet 21. In the preferred form of the invention, several pole pieces would be used and the flux would then return through an adjacent pole piece. Since the material 22 being sent under the detector is non-magnetic, the air gap 24 plus the material thickness 22 determine the total flux passing through the magnet by controlling the reluctance of the magnetic circuit.

The coil 20 wrapped around the magnet senses the flux of this system. It measures change in flux in accordance with the equation $$e = n \frac{d\phi}{dt}$$

wherein $e$ is the induced voltage in the coil, $n$ is the number of turns on the coil, and $d\phi/dt$ is the time derivative of the flux passing through the coil, that is, $d\phi/dt$ is the change in flux per unit time.

The total gap (air gap 24 plus material thickness 22) is usually constant and does not vary with time. If the gap does not vary, the flux does not vary, and the output voltage from the coil 20 is zero since $$\frac{d\phi}{dt} = 0$$

If a piece of metal in the material 22 enters the gap between the pole piece 21 and the backing plate, the metal disturbs the flux depending on the following factors:

(1) Size or shape of the piece of metal.
(2) Type of metal—whether magnetic or non-magnetic.
(3) Velocity of the piece passing through.

By connecting the output from coil 20 to a detection apparatus, the flux change is differentiated and appears as a voltage signal from the coil.

Figure 3:
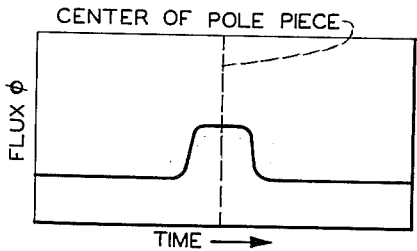
FIG. 3 is a graph indicating the amount of magnetic flux as a function of time during the passing of a piece of metal under the device.

When a magnetic material, such as a piece of iron, passes under the pole piece, the flux increases, as shown in FIG. 3. The maximum flux occurs when the iron is directly under the pole piece. If the pole piece is wide, or if the piece of metal is large, the curve is flat and rectangular in shape, as that shown in FIG. 3. If the piece of metal is small and the pole piece is narrow, then the curve of flux versus time will be sharp and narrow, such as that shown in FIG. 4. The duration of the signal depends on the time which the particle is under the pole piece.

Figure 4:
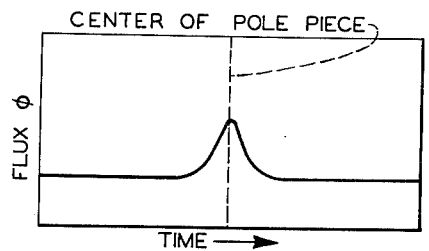
FIG. 4 is a graph indicating the amount of magnetic flux where the piece of metal is small and the pole piece is narrow.
Figure 5:
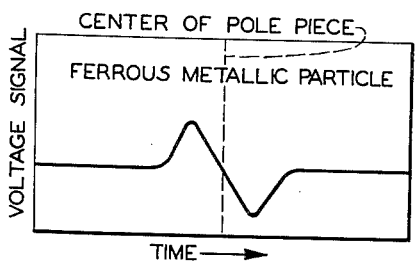
FIG. 5 is a graph indicating the voltage signal as a function of time when a magnetic particle passes under the device.

The output voltage from a flux increase such as that shown in FIG. 4 will appear as shown in FIG. 5, which is the derivative of this flux pattern with respect to time. This appears as an electrical pulse which can be used to actuate an alarm or perform some useful function through an integrating network. It can also be presented as a change in magnetic flux if necessary.

Figure 6:
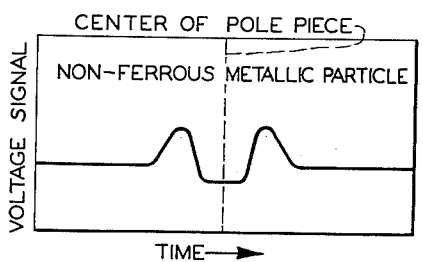
FIG. 6 is a graph indicating the voltage signal when a non-magnetic metallic particle passes under the device.

When a piece of non-magnetic metal passes under the pole piece, the output voltage will still differ. When a non-magnetic conducting particle moves in a magnetic field, it has a voltage induced within it which causes circulating currents known as eddy currents. These currents set up their own magnetic field in opposition to the generating magnetic field in accordance with Lenz's law. It can be shown that this type of reaction causes the response to be typical of a second derivative, i.e., $d^2\phi/dt^2$, which results in an output voltage pattern similar to that shown in FIG. 6. The output is smaller and is dependent not only on the size or shape of the piece of metal and velocity of the piece passing through, but also on the volume resistivity of the particle. The volume resistivity controls the magnitude of the eddy currents. Thus, the device of this invention can discriminate between a magnetic ferrous particle and a non-magnetic or non-ferrous particle by examining the generated waveshape. This can be done visually by use of an oscilloscope.

Figure 7:
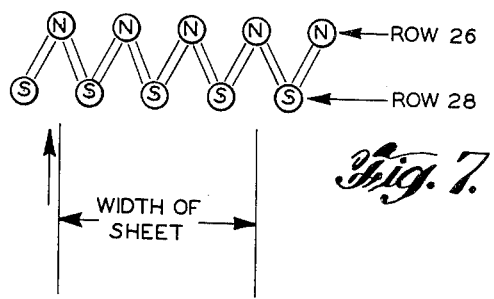
FIG. 7 is a plan view of a possible arrangement of magnetic poles of the device of the invention.

The sensitivity of the system is directly proportional to the particle size, flux density, coil turns, particle permeability, and velocity and is inversely proportional to the air gap spacing. Since one pole piece or detection element is effective only over a relatively small width, a set of pole pieces can be arranged across the width of a sheet with an arrangement such as that shown in FIG. 7. The poles of each magnet are set as indicated with one row 26 having north poles upward and the other row 28 having the south poles upward. By having a series of poles, the "flux" combs the entire width of the material passing through. Since the output signal from several detection elements must be added, the coils are connected in series.

A U-shaped, channel magnet, as shown in FIGS. 8 and 9 can also conveniently be used where the coil 20 is wound lengthwise, as shown. A number of these magnets can also be hooked up in series to cover a wider width. Such magnets are commercially available in a six-inch width.

As an example of the invention, a ¾" thick steel plate was mounted on a heavy duty turntable, such as that used for sound recording on phonograph discs. The steel plate provided the magnetic backing, and a pickup consisting of 10 north and 10 south poles was mounted about ⅛" above the plate surface. Since the speed of the plate was 33⅓ r.p.m., the linear edge speed was 1670"/min. or 28"/sec.

Typical observed pulses for magnetic and non-magnetic materials placed on the surface of the table are shown in FIGS. 10, 10a, 10b, and 10c. A paper clip was cut into a piece ½" long and secured to the table surface as an example of a magnetic particle. A short piece of a number 14 copper wire was used as a non-magnetic disturbance.

FIG. 10 shows the output pulse for the piece of paper clip at A as it appeared on an oscilloscope screen connected to the pickup. The pulse for a copper wire is shown at B on FIG. 10.

FIG. 10a shows the magnetic material response expanded and FIG. 10b shows the pulse using a simple integrator circuit.

FIG. 10c shows pulses for four magnetic particles of different sizes.

The detection device described can be used in many ways. For example, FIG. 11 shows a typical four roll calender, such as commonly used in the production of plastic film and sheeting, utilizing the device. The material 70 is fed to the calender and passes between rolls 72 and 74. The distance between these rolls is usually greater than between rolls 76 and 78 where the final forming takes place. A metal detector of the type described in this invention is located at position 80. If a small piece of metal passes detector 80, auxiliary equipment connected to the detector can be set to stop the calender rolls and permit the metallic particle to be removed before it reaches the finishing rolls 76 and 78.

Figure 12A:
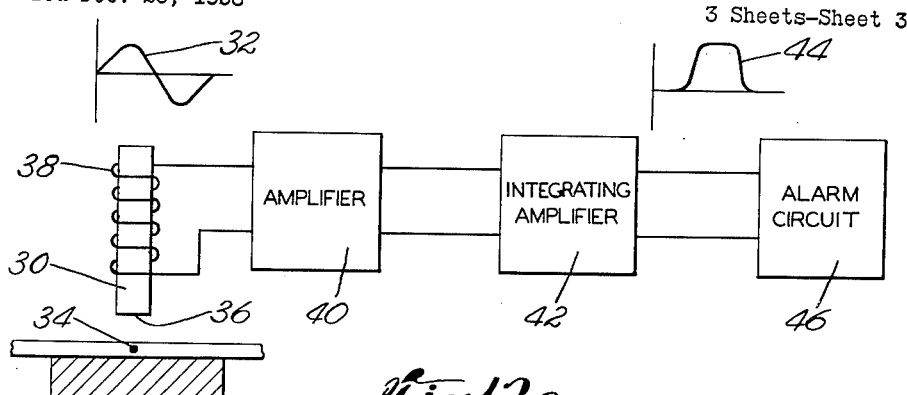
FIG. 12a is a block diagram of the circuit used in connection with the invention.
Figure 12B:
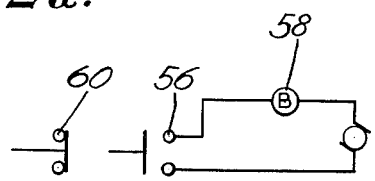
FIG. 12b shows the alarm circuit of FIG. 12a in detail.

A schematic diagram of a complete detector system is shown in FIG. 12a. A detector 30 provides a signal 32 when a magnetic contaminant 34 passes under the pole piece 36. The voltage induced in coil 38, which actually may be several coils in series, is passed onto the amplifier 40 to magnify the signal. This amplified signal is then passed into an integrating amplifier 42 which yields a rectangular signal 44. The integrating amplifier, in addition to restoring the shape of the disturbance, also minimizes the noise developed by the detection circuit. This signal then passes to an alarm circuit 46, shown in detail in FIG. 12b.

The alarm circuit can comprise a gas filled trigger tube, such as a thyratron 50, biased to cut-off by the battery 48. The appearance of the pulse fires the tube, allowing the battery 52 to pass current through the relay 54 into the thyratron. Once fired, the thyratron keeps the relay 54 in, closing the set of contacts 56 and a bell alarm 58 in an auxiliary circuit is sounded. If desired, an additional set of normally closed contacts 60 can be installed in series with the calender rolls to stop them by de-energizing the motor drive. The alarm will stay in until the thyratron plate supply circuit is reset by opening the normally closed switch 62. An inking, marking or cutting device to indicate the position of the tramp metal can also be activated by the detector output.

Non-magnetics are detected in a similar manner, but in this case it may be desirable to insert a second integrating amplifier after the first unit 42 so as to perform two integrations. It is possible to separate magnetic from non-magnetic contaminants by placing two alarm circuits, one after the first integration and another after the second integration.

The detector operates over any conveniently shaped magnetic surface. The metal base plate need not be metal surfaced if the non-metallic coating is thin. Coated or plated steel is desirable where the base plate is subject to corrosion.

The detector can be used over a completely non-magnetic surface but its sensitivity is low, and a very small air gap must be used.

The device can also be used to detect metal particles in powders. Suitable auxiliary equipment can be set to reject the portion containing the metal. This method would be particularly useful in detecting and eliminating non-magnetic metals which are not removed by the usual tramp metal magnetic separators.

The device can also be used to detect metals in ground ores, either in powder form or in form of a slurry. By connecting the output to a suitable recorder, the metallic content can be recorded or sorted by suitable equipment.

Figure 13:
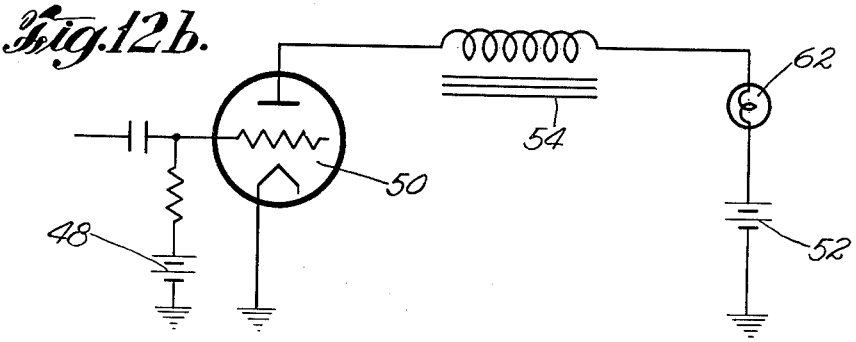
FIG. 13 shows an embodiment of the invention useful in detecting metal particles in insulation for electrical wire.
Figure 13:
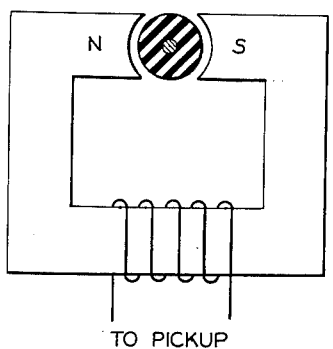

The device can also be used in the wire and cable industry to detect metal particles in wire insulation, to detect discontinuities (breaks) and other irregularities in the copper conductor itself. FIG. 13 shows the type of detector used in this case. The pole pieces are shaped to fit snugly around the contour of the insulated wire passing therethrough.

The device can also be used on a two-roll mill in the compounding of plastic or rubber to detect metal at that point prior to feeding to a calender or other equipment.

The device is also valuable for use on stock to be fed in sheet form to a dicing or shredding machine to warn of metal which could dull the cutters or contaminate the product.

I claim:
1. A method of detecting pieces of metal present in a non-metallic substance which comprises the steps of passing the substance between a pole of a magnet and a magnetic plate disposed at a fixed distance from said pole and sensing the change in magnetic flux caused by said pieces of metal.

2. A method of detecting pieces of metal present in a non-metallic substance which comprises the steps of passing a magnetic flux between the pole of a magnet and a magnetic backing plate disposed at a fixed distance therefrom, passing said non-metallic substance containing said metal between said pole and said plate while maintaining the magnetic flux therebetween and sensing the change in magnetic flux within the magnetic circuit including the backing plate and the magnet caused by said pieces of metal.

3. An apparatus for monitoring metal which comprises, in combination, a permanent magnet having magnetic poles, a backing plate of magnetic material disposed a fixed distance away from one of the magnetic poles but within the field of magnetic flux emitted from said pole, and means for sensing the change in magnetic flux caused by the movement of said metal through said magnetic flux.

4. An apparatus according to claim 3, in which said means for sensing the change in magnetic flux is a coil of wire disposed around said permanent magnet.

5. An apparatus for detecting pieces of metal present in a non-metallic substance which comprises a permanent magnet having magnetic poles emitting magnetic flux, a backing plate of magnetic material disposed a fixed distance away from one of said poles but within the magnetic flux emitted by said pole, a coil of wires disposed around said permanent magnet and within the magnetic flux and a means for producing an electrical signal when said magnetic flux is changed by the movement of said pieces of metal within the magnetic flux.

6. An apparatus for detecting pieces of metal present in a non-metallic substance which comprises a plurality of permanent magnets disposed with respect to each other so that the magnetic flux emitted by the poles of half the magnets enter the poles of the other magnets, a backing plate of magnetic material disposed a fixed distance from the poles of said magnets but within the magnetic flux emitted by said magnets so that said magnetic flux passes through said backing plate before returning to the magnets, and means for sensing the change in magnetic flux caused by the movement of said metal pieces through the magnetic flux.

7. An apparatus for detecting pieces of metal present in a non-metallic material which comprises a permanent magnet having a U-shaped cross-section, the north pole of the magnet being disposed within one leg of the U and the south pole being disposed within the other leg of the U, a backing plate of magnetic material disposed a fixed distance from the ends of said poles but within the magnetic flux passing between said poles, and means for sensing the change in magnetic flux caused by the movement of said metal pieces through the magnetic flux.

8. An apparatus for detecting pieces of metal present in a non-metallic substance which comprises a permanent magnet having magnetic poles, a backing plate of magnetic material disposed a fixed distance away from one of the poles but within the magnetic flux emitted from said pole, means for passing the non-metallic substance containing the pieces of metal between said magnetic pole and said backing plate and means for sensing the change in magnetic flux caused by the movement of said pieces of metal through said magnetic flux.

9. An apparatus according to claim 8, in which said means for sensing the change in magnetic flux is a coil of wire disposed around said permanent magnet.

10. An apparatus for detecting pieces of metal present in a non-metallic substance which comprises a permanent magnet having magnetic poles emitting magnetic flux, a backing plate of magnetic material disposed a fixed distance away from one of said poles but within the magnetic flux emitted by said pole, means for passing the non-metallic substance containing the pieces of metal between said magnetic pole and said backing plate, a coil of wires disposed around said permanent magnet and within the magnetic flux and a means for producing an electrical signal when said magnetic flux is changed by the movement of said pieces of metal within the magnetic flux.

11. An apparatus for detecting pieces of metal present in a non-metallic substance which comprises a plurality of permanent magnets disposed with respect to each other so that the magnetic flux emitted by the poles of half the magnets enter the poles of the other magnets, a backing plate of magnetic material disposed a fixed distance from the poles of said magnets but within the magnetic flux emitted by said magnets so that said magnetic flux passes through said backing plate before returning to the magnets, means for passing the non-metallic substance containing the pieces of metal between said magnetic poles and said backing plate, and means disposed around said magnets for sensing the change in magnetic flux caused by the movement of said metal pieces through the magnetic flux.

12. An apparatus for detecting pieces of metal present in a non-metallic material which comprises a permanent magnet having a U-shaped cross-section, the north pole of the magnet being disposed within one leg of the U and the south pole being disposed within the other leg of the U, a backing plate of magnetic material disposed a fixed distance from the ends of said poles but within the magnetic flux passing between said poles, means for passing the non-metallic material between the poles and the backing plate and means disposed about said magnet for sensing the change in magnetic flux caused by the movement of said metal pieces through the magnetic flux.

References Cited in the file of this patent

UNITED STATES PATENTS

| | | |
|---|---|---|
| 1,897,731 | Manegold | Feb. 14, 1933 |
| 2,179,240 | Breitenstein | Nov. 7, 1939 |
| 2,255,053 | Gunn | Sept. 9, 1941 |
| 2,290,930 | Wurzbach | July 28, 1942 |
| 2,477,057 | Grady | July 26, 1949 |
| 2,481,345 | Reynst | Sept. 6, 1949 |
| 2,503,247 | Daum et al. | Apr. 11, 1950 |
| 2,944,213 | Foerster | July 5, 1960 |